June 14, 1932. T. K. WEBSTER, JR 1,863,316
TRACTION MAT
Filed Dec. 24, 1930
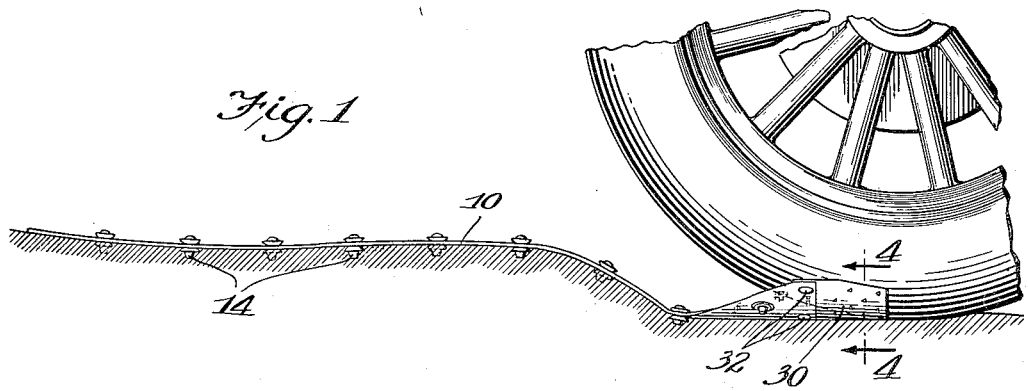
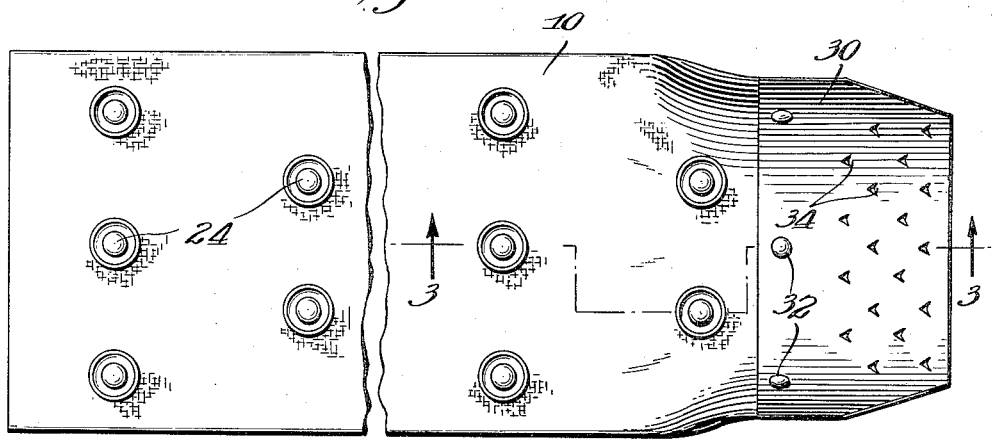
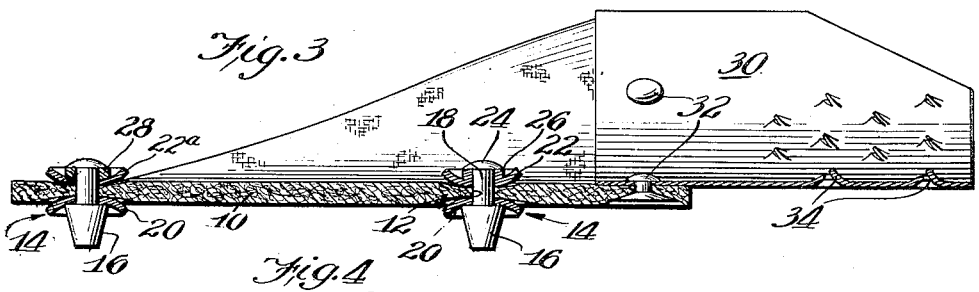
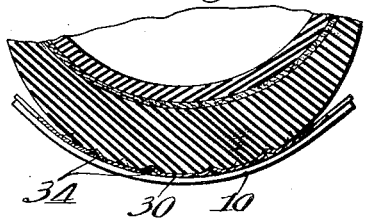
Inventor:
Towner K. Webster, Jr.
By Williams, Bradbury, McCaleb & Hinkle
Attys.

Patented June 14, 1932

1,863,316

UNITED STATES PATENT OFFICE

TOWNER K. WEBSTER, JR., OF WINNETKA, ILLINOIS

TRACTION MAT

Application filed December 24, 1930. Serial No. 504,589.

My invention relates to traction mats, particularly for use with automotive vehicles, to provide a traction surface to aid in driving the vehicle under its own power from a surface such as snow, ice, mud or sand, which does not otherwise offer sufficient traction to prevent the driving wheels from slipping.

It is an object of my invention to provide an improved device of the above described character in which a flexible strip having suitable gripping studs secured thereto is secured to a sheet metal member conformed to the approximate shape of the tire so as to aid in starting the wheel on the strip.

A further object is to provide a traction mat for the above mentioned purposes which is extremely simple in construction and may be economically manufactured.

Other objects will appear from the following description, reference being had to the accompanying drawing, in which:

Figure 1 is a side elevation of the traction mat, shown in the position in which it is used;

Figure 2 is a plan view thereof;

Figure 3 is a sectional view taken on the line 3—3 of Fig. 2; and

Figure 4 is a sectional view taken on the line 4—4 of Fig. 1.

The traction mat of my invention comprises a longitudinal strip 10 of any suitable fabric or similar material which is preferably treated in a suitable manner to make it impervious to moisture. The strip 10 has a plurality of apertures 12 formed therein to receive studs 14. These studs each comprise a head 16 substantially frusto-conical in shape and having a shank 18 of reduced diameter passing through a pair of washers 20 and 22, the end of the shank being riveted to form a head 24, thereby to secure the stud 14. The washers 20 and 22 are preferably dished so that they will not cut into the fabric strip 10, and the washer 22 preferably has an upwardly extending annular flange 26 around its central opening so as to provide a surface against which the head 24 may be riveted. In the left-hand portion of Figure 3, the upper washer 22ª does not have this upwardly extending flange 26, but instead a small circular washer 28 is utilized for the same purpose.

A shoe 30 of relatively thin sheet material is secured to one end of the strip 10 by a plurality of rivets 32. This shoe is trough-shaped to conform generally to a pneumatic tire of a vehicle, but is sufficiently flexible that should its radius of curvature be smaller than that of the tread of the tire with which it is used, it will flatten out to conform to the shape of the tire. The shoe has a plurality of upwardly struck projections 34 which are engageable with the tread of the tire to prevent slipping of the tire on the shoe. These projections 34 are preferably substantially triangular in shape and project upwardly at an angle, so that they will project into the tread of the tire even before the weight of the vehicle is upon the shoe.

In use, the shoe is placed in front of the wheel and forced up against the tire, and the strip extended longitudinally in front of the tire, as indicated in Figure 1. Due to the fact that the under side of the shoe is smooth, it may readily be placed in position against the tire with its projections 34 biting into the tread, so that when the vehicle is started, the shoe will be pulled beneath the tire. After this slight movement of the shoe, the studs 14 will come into action to prevent further slippage of the shoe and the strip, and the wheel will ride upwardly out of the depression in the road upon the strip 10, the studs 14 preventing slippage of the strip 10 relative to the ground as well as slippage of the tire relative to the strip.

One of the principal advantages of the traction mat of my invention is that the shoe need not be placed beneath the tire in order to permit effective use of the mat. It need merely be placed up against the surface of the tire adjacent the portion of the tire which bears on the ground, and the initial movement of the tire will, because of the gripping effect of the projections 34, pull the shoe beneath the tire and thereafter permit the wheel of the vehicle to roll over the traction strip without slipping. Since the strip is made of flexible material it will, as the wheel rolls over it, conform to the shape of the tire and insure good frictional contact.

While I have illustrated and described a preferred embodiment of my invention, modifications may be made without departing from the spirit of the invention, and I do not wish to be limited to the precise details set forth but desire to avail myself of all changes within the scope of the appended claims.

I claim:

1. A traction mat comprising a sheet metal shoe portion having a plurality of diagonally upwardly extending sharp projections, said shoe being sufficiently pliable to conform to the shape of a vehicle tire, a strip of flexible material having one of its ends secured to said shoe, and a plurality of studs secured to said strip and projecting from the opposite sides thereof.

2. A traction mat comprising a strip of flexible material substantially the width of a vehicle tire with which it is to be used, a plurality of headed studs secured to said strip and projecting from the opposite sides thereof, dished washers on said studs to prevent the heads of said studs from cutting into said strip, and a sheet metal trough-shaped shoe secured to one end of said strip and having a plurality of short projections struck upwardly therefrom.

3. A traction mat comprising a strip of fabric material impregnated with a waterproofing compound, a plurality of studs secured in said strip and having their ends projecting from the opposite sides thereof, means on said studs to prevent them from cutting into the fabric of said strip, and a shoe permanently secured to one end of said strip, said shoe being of thin sheet metal and having a plurality of projections struck upwardly therefrom.

In witness whereof, I hereunto subscribe my name this 19 day of December, 1930.

TOWNER K. WEBSTER, Jr.